United States Patent [19]

Arnold

[11] Patent Number: 4,899,693

[45] Date of Patent: Feb. 13, 1990

[54] COOLED PET BED

[76] Inventor: Robert D. Arnold, 804 N. 5th St., Cottonwood, Ariz. 86326

[21] Appl. No.: 338,042

[22] Filed: Apr. 14, 1989

[51] Int. Cl.⁴ .............................................. A01K 1/00
[52] U.S. Cl. ......................................... 119/1; 5/422
[58] Field of Search ............... 119/1; 5/421, 284, 420; 224/148, 202, 205

[56] References Cited

U.S. PATENT DOCUMENTS

| Re. 32,420 | 5/1987 | Autrey et al. | 5/451 |
|---|---|---|---|
| D. 256,734 | 9/1980 | Riley | 119/1 |
| 2,661,718 | 12/1953 | Ruport | 119/15 |
| 2,715,315 | 8/1955 | Giardini | 62/1 |
| 2,959,938 | 11/1960 | Giardini | 62/384 |
| 3,258,065 | 6/1966 | Ward | 5/421 |
| 3,854,156 | 12/1974 | Williams | 5/421 |
| 4,040,133 | 8/1977 | Gilraath | 5/451 |
| 4,060,276 | 11/1977 | Lindsay | 5/421 |
| 4,064,835 | 12/1977 | Rabenbauer | 119/1 |
| 4,140,254 | 2/1979 | Land | 224/148 |
| 4,332,214 | 6/1982 | Cunningham | 119/1 |
| 4,686,721 | 8/1987 | Hubert | 4/451 |
| 4,691,664 | 9/1987 | Crowell | 119/61 |

FOREIGN PATENT DOCUMENTS

| 21184 | of 1907 | United Kingdom | 224/148 |
|---|---|---|---|
| 923758 | 4/1963 | United Kingdom | 5/421 |

Primary Examiner—Paul J. Hirsch
Attorney, Agent, or Firm—Jerry T. Kearns

[57] ABSTRACT

A cooled portable pet bed has an insulated base with a central recess dimensioned to receive a container having a sealable opening for the insertion of ice cubes. An open weave fabric mattress covers the upper surface of the container to form a cooled mattress for a pet. A removable carrying strap allows the container to be utilized as a canteen for drinking water. The container may be formed from a rigid or durable flexible material.

1 Claim, 3 Drawing Sheets

COOLED PET BED

BACKGROUND OF THE INVENTION

1. Field of the Invention

The present invention relates to pet beds, and more particularly pertains to an improved portable pet bed provided with facilities for cooling a pet. Furry pets such as cats and dogs are frequently overheated during the summer months, especially when being transported in a vehicle. In order to maintain these pets as comfortably as possible during such transportation, the present invention provides a pet bed which utilizes an ice filled container to cool a pet mattress and to store a supply of drinking water.

2. Description of the Prior Art

Various types of pet beds are known in the prior art. A typical example of such a cooled pet bed is to be found in U.S. Pat. No. 2,661,718, which issued to A. Ruport on Dec. 8, 1953. This patent discloses a cooling unit for rabbit hutches which utilizes a plurality of cooling coils fed with a fluid cooling medium by a conduit. U.S. Pat. No. 2,715,315, which issued to G. Giardini on Aug. 16, 1955, discloses a wrist band applicator having a housing receiving a quantity of ice and a strap for securing the housing to the wrist of an individual. U.S. Pat. No. 2,959,938, which issued to G. Giardini on Nov. 15, 1960, discloses a body cooling device having a housing for holding a quantity of dry ice for cooling body parts of an individual. U.S. Pat. No. 4,064,835, which issued to L. Rabenbauer on Dec. 27, 1977, discloses an air conditioned pet bed wherein a portable unit is provided with an insulated bottom portion containing reusable pre-frozen chemical ice packs and a top portion which fits over the bottom portion and has a planar perforated surface to provide an area for a pet to recline and prevent direct contact with the ice packs, thereby providing cooling of the pet through the perforations in the top portion. U.S. Pat. No. 4,691,664, which issued to W. Crowell on Sept. 8, 1987, discloses a pet dish for serving liquids to small animals which includes a base housing containing a frozen gel for maintaining the liquid at a reduced temperature over extended periods.

While the above mentioned devices are directed to cooled pet beds, none of these devices disclose a pet bed having a base which serves as a pet drinking dish and an insertable cooling unit which serves as a canteen for storing a quantity of drinking water for human and animal consumption. Inasmuch as the art is relatively crowded with respect to these various types of pet beds, it can be appreciated that there is a continuing need for and interest in improvements to such pet beds, and in this respect, the present invention addresses this need and interest.

SUMMARY OF THE INVENTION

In view of the foregoing disadvantages inherent in the known types of pet beds now present in the prior art, the present invention provides an improved cooled pet bed. As such, the general purpose of the present invention, which will be described subsequently in greater detail, is to provide a new and improved cooled pet bed which has all the advantages of the prior art pet beds and none of the disadvantages.

To attain this, a representative embodiment of the concepts of the present invention is illustrated in the drawings and makes use of an insulated base with a central recess dimensioned to receive a container having a sealable opening for the insertion of ice cubes. An open weave fabric mattress covers the upper surface of the container to form a cooled mattress for a pet. A removable carrying strap allows the container to be utilized as a canteen for drinking water. The container may be formed from a rigid or durable flexible material.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cooled pet bed which has all the advantages of the prior art pet beds and none of the disadvantages.

It is another object of the present invention to provide a new and improved cooled pet bed which may be easily and efficiently manufactured and marketed.

It is a further object of the present invention to provide a new and improved cooled pet bed which is of a durable and reliable construction.

An even further object of the present invention is to provide a new and improved cooled pet bed which is susceptible of a low cost of manufacture with regard to both materials and labor, and which accordingly is then susceptible of low prices of sale to the consuming public, thereby making such pet beds economically available to the buying public.

Still yet another object of the present invention is to provide a new and improved cooled pet bed which provides in the apparatuses and methods of the prior art some of the advantages thereof, while simultaneously overcoming some of the disadvantages normally associated therewith.

Still another object of the present invention is to provide a new and improved cooled pet bed to enable animals to be transported in comfort within automobiles during the summer months.

Yet another object of the present invention is to provide a new and improved cooled pet bed which utilizes a removable cooling unit which stores a quantity of drinking water for animal or human consumption.

Even still another object of the present invention is to provide a new and improved cooled pet bed having a base portion which may be utilized as an animal drinking dish.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
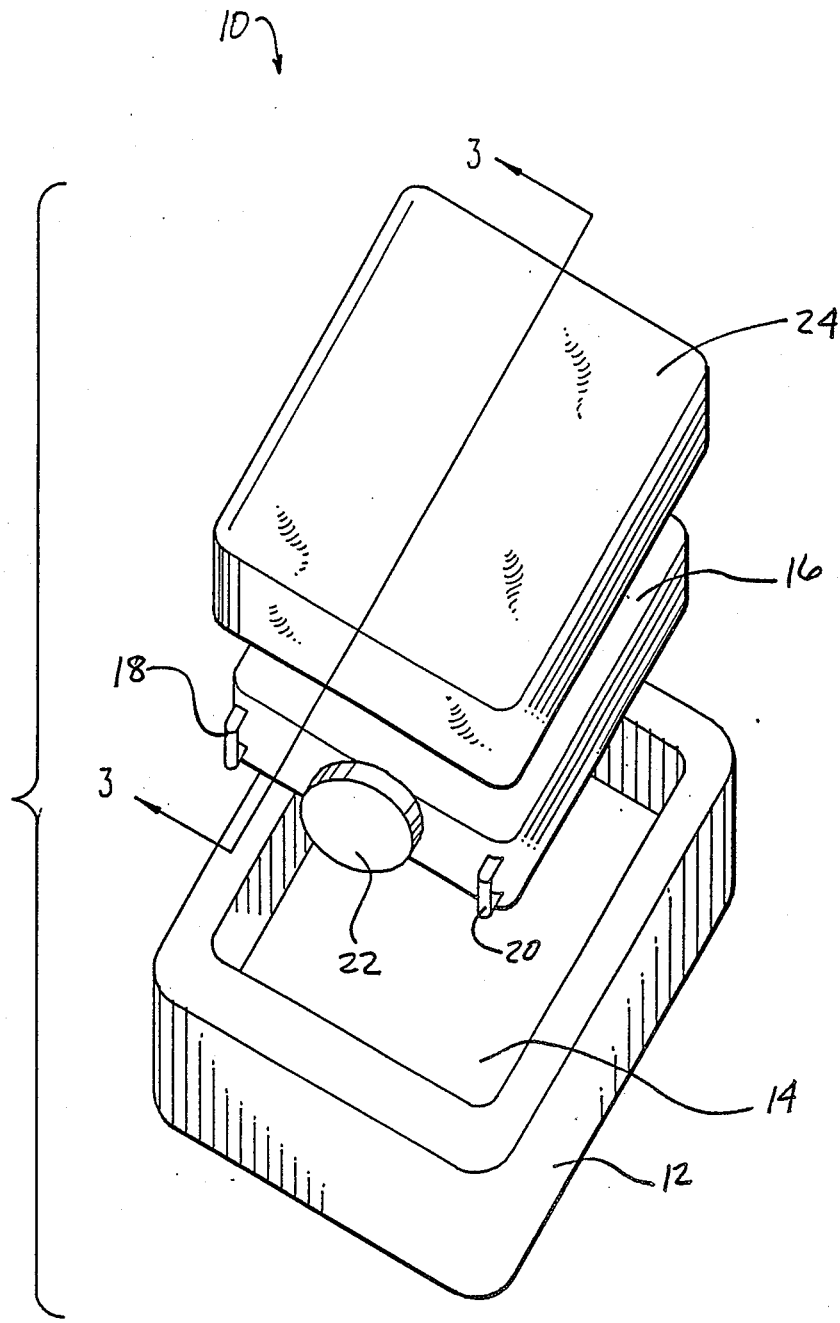
FIG. 1 is an exploded perspective view illustrating the cooled pet bed of the present invention.

With reference now to the drawings, and in particular to FIG. 1 thereof, a new and improved cooled pet bed embodying the principles and concepts of the present invention and generally designated by the reference numeral 10 will be described.

More specifically, it will be noted that the first embodiment 10 of the invention includes a generally rectangular base 12 having floor and interior side wall portions surrounding a central rectangular recess 14. The base 12 may form a pet dish for enabling an animal to drink during transportation. A shallow rectangular cooling unit 16 is dimensioned for insertion within the central recess 14 of the base 12. The cooling unit 16 is configured as a container having a neck portion covered by a removable screw on cap 22. The neck portion of the container 16 is dimensioned to allow insertion of ice cubes into the interior of the container 16, to provide for a cooling effect. Additionally, the container 16 is formed from a water proof plastic material which enables the container 16 to serve as a canteen for the storage of a quantity of drinking water created by the melting ice for the consumption of humans or animals. The container 16 may be formed from a rigid or flexible plastic material, but should be sufficiently durable to resist the teeth and claws of small animals. A pair of rigid loops 18 and 20 are provided on the top surface of the container 16, on opposite sides of the cap 22 for the retention of a removable carrying strap. In this fashion, the container 16 may be carried in the manner of a canteen. A flexible open weave fabric mattress 24 covers an upper surface of the cooling unit or container 16 and provides a cooled soft surface upon which an animal may rest in comfort during transportation within a vehicle to another location.

Figure 2:
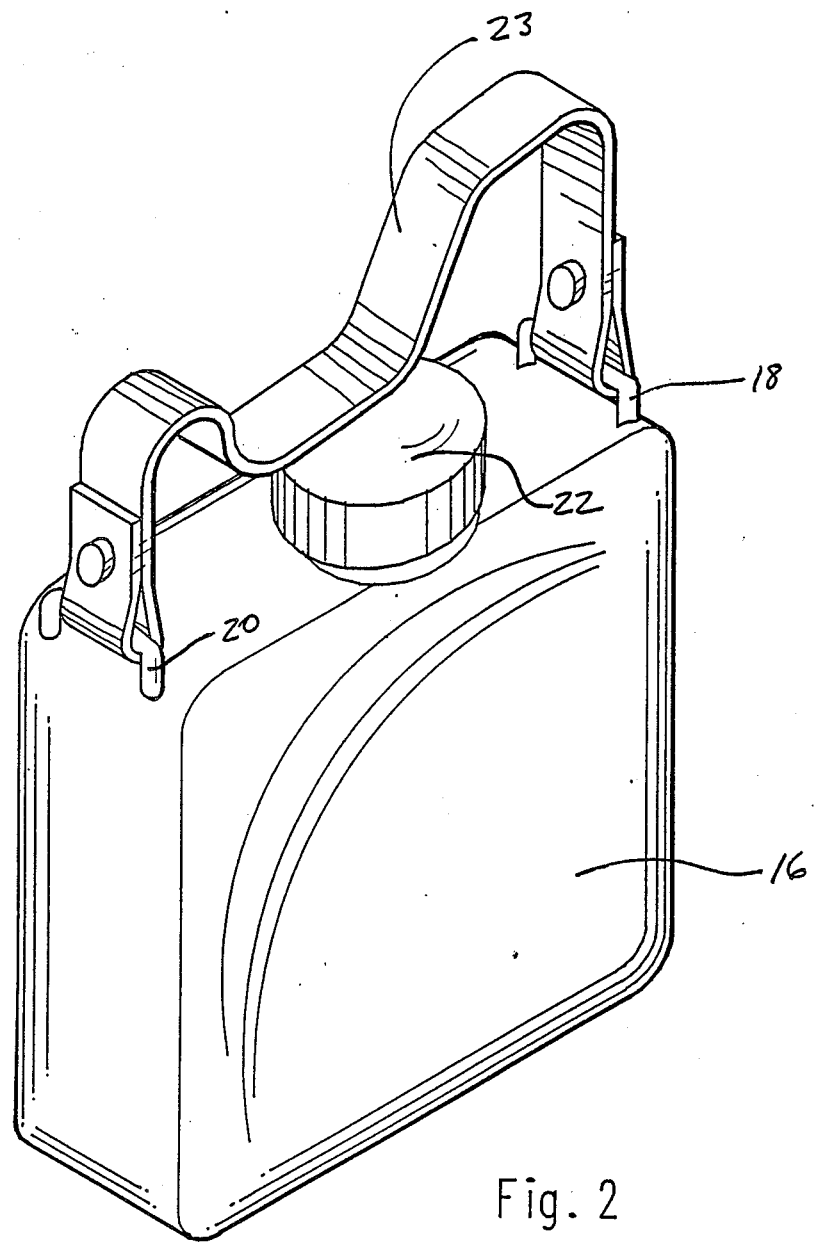
FIG. 2 is a perspective view illustrating the removable cooling unit and canteen portion of the pet bed of the present invention.

FIG. 2 is a perspective view which further illustrates the cooling unit or canteen 16, removed from the base unit. The carrying strap 23 is preferably formed from a flexible fabric material and includes snap fasteners for securement to the loops 18 and 20.

Figure 3:
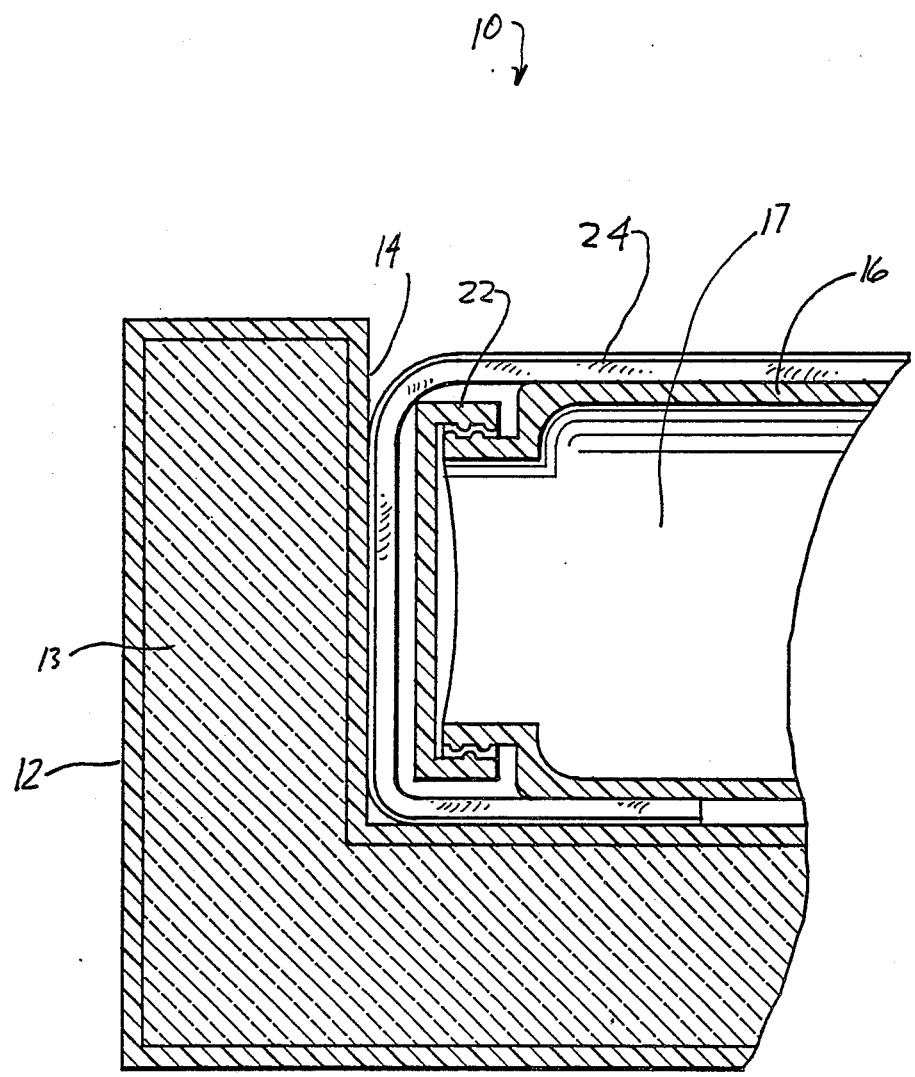
FIG. 3 is a cross sectional view, taken along line 3—3 of FIG. 1, further illustrating the construction of the assembled pet bed.

FIG. 3 is a cross sectional view which illustrates the assembled construction of the cooled pet bed 10. The base 12 has a durable molded plastic outer covering which surrounds an interior core 13. The core 13 may be formed from an insulated foam material or may include a refreezable gel refrigerant, to provide increased cooling capacity. The fabric open weave mattress 24 forms a sealing gasket which is frictionally retained between the interior side wall portions within the central recess 14 of the base 12. The container or cooling unit 16 is dimensioned to fit snugly within the recess 14, with a clearance dimensioned to frictionally retain the mattress 24 as a sealing gasket. This construction maintains the pet bed 10 in a securely assembled relation when desired, and additionally serves to minimize heat transfer losses to the ambient environment.

As may now be understood, the present invention provides a cooled pet bed which also provides pet dish and drinking water facilities for an animal during transportation. The device is extremely compact for storage purposes and allows an animal to be transported in comfort within the interior of a vehicle, even during the hot summer months.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A combination portable cooled pet bed and drinking reservoir for storing drinking water for human and animal consumption, comprising:

a base formed from a waterproof plastic material and having insulated floor and side wall portions surrounding a rectangular central recess;

said base including an encapsulated refreezable gel refrigerant completely surrounding bottom and sidewalls of said recess;

said base and said recess dimensioned to provide a drinking water dish for small animals;

a rectangular waterproof canteen for carrying drinking water, said canteen having a sealable opening dimensioned to allow insertion of ice cubes, said container dimensioned for reception in said central recess of said base, with a rectangular side surface of said canteen disposed slightly below a top surface of said base;

an open weave fabric mattress for selectively covering an upper surface of said canteen to form a cooled mattress for a pet;

said central recess closely conforming to said canteen and said fabric mattress forming a sealing gasket around said canteen, retained by frictional engagement with side wall portions of said base, said fabric mattress having a thickness such that said mattress is disposed at a level approximately even with said top surface of said; and means removably securing a carrying strap to said canteen, whereby said canteen may be removed from said base and carried separately from said base, and said recess may be filled with water from said canteen for pet consumption.

* * * * *